United States Patent

Bosch

[15] 3,645,395

[45] Feb. 29, 1972

[54] APPARATUS FOR SORTING SIMILAR TYPE OBJECTS

[72] Inventor: Jakob Bosch, St. Gallen, Switzerland

[73] Assignee: Heinrich Schmid, vorm. Schmid & Solin, St. Gallen, Switzerland

[22] Filed: Nov. 6, 1970

[21] Appl. No.: 87,403

[30] Foreign Application Priority Data

Nov. 13, 1969 Switzerland..........................16916/69

[52] U.S. Cl..............................................................209/91
[51] Int. Cl..........................................................B07c 5/00
[58] Field of Search........................209/91, 88, 74, 104, 108

[56] References Cited

UNITED STATES PATENTS

| | | | |
|---|---|---|---|
| 3,286,813 | 11/1966 | Fuhrimann............................209/90 X |
| 3,008,579 | 11/1961 | Bartlett....................................209/91 |
| 3,313,410 | 4/1967 | Gardner..............................209/91 X |

Primary Examiner—Richard A. Schacher
Assistant Examiner—Gene A. Church
Attorney—Karl W. Flocks

[57] ABSTRACT

An apparatus for sorting substantially similar type objects which differ from one another either in terms of the properties of two oppositely situated surfaces of the object or in terms of the spacing of such two surfaces from one another. In order to effectively sort such objects, the inventive apparatus incorporates two entrainment members possessing object entrainment surfaces spaced in substantial parallelism from one another. When the apparatus is utilized for sorting objects possessing different spacing of such surfaces, then, the entrainment members can be movably driven in the same sense or direction, and in the other situation where there are sorted objects whose surfaces possess different properties, such entrainment members are driven in a manner that at least the overlapping portions of such entrainment members are moved in a respective opposite sense or direction with respect to one another.

10 Claims, 4 Drawing Figures

APPARATUS FOR SORTING SIMILAR TYPE OBJECTS

BACKGROUND AND SUMMARY OF THE INVENTION

The present invention relates to a new and improved apparatus for sorting essentially similar type objects, differing from one another either in the characteristics or properties of two oppositely situated surfaces of such objects or differing from one another in terms of the spacing of such two surfaces from one another.

The equipment of the present invention is suitable for sorting many different types of objects which are essentially similar, and is particularly useful for performing an automatic sorting of flat objects as a function of their function of their rough and smooth surfaces, for instance, as would exist with punched or stamped parts, as a function of the side of the object containing burrs or fins or the like and the side which is circular or round, or also for automatically sorting flat or round objects as a function of their thickness and flatness.

Apart from the foregoing objective of the present invention, there is also proposed equipment for automatically sorting objects in a most rapid, reliable and relatively foolproof manner.

Still a further significant object of the present invention relates to the provision of improved type of sorting equipment for essentially similar objects, which equipment is relatively simple in construction, economical to manufacture, extremely reliable in operation, and provides for accurate sorting of the objects when same possess either different properties of oppositely situated surfaces or different spacing of such surfaces from one another.

Yet a further noteworthy object of the present invention relates to sorting equipment which is not only economical to manufacture and easy to use, but possesses a minimum of components which are sensitive to malfunction, therefore requiring less servicing and maintenance of the equipment.

Now, in order to implement these and still further objects of the invention, which will become more readily apparent as the description proceeds, the inventive sorting apparatus is generally manifested by the features that there are provided two entrainment members possessing object entrainment surfaces which are spaced at a predetermined distance in substantial parallelism with respect to one another. When the apparatus is used for sorting objects possessing different spacing of the object surfaces from one another, then such entrainment members can be movably driven in the same direction or sense, whereas when the equipment is used for the other situation mentioned above, namely, when sorting objects here the oppositely situated surfaces possess different characteristics or properties, then at least the overlapping portion of such entrainment members are driven in opposite direction or sense with respect to one another insofar as such overlapping portions is concerned. As will be explained more fully hereinafter, this is in effect the case whether the entrainment members themselves are driven in the same sense or opposite senses with regard to one another.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
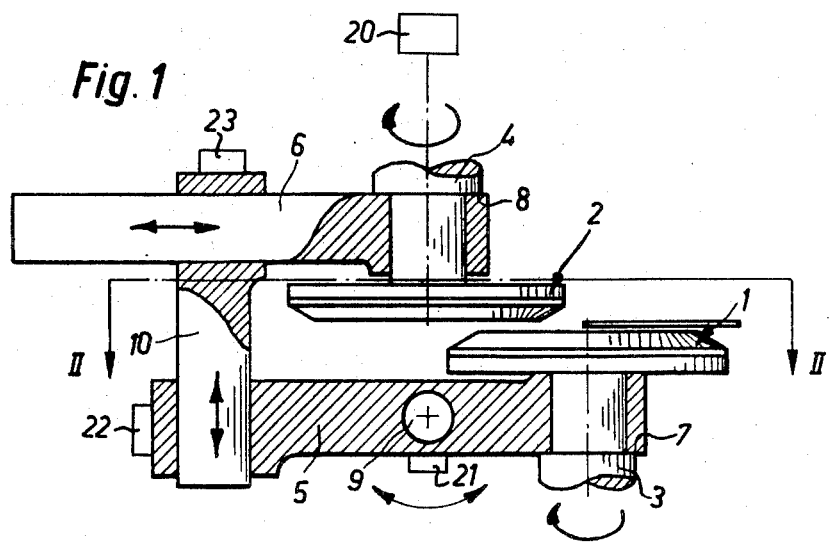
FIG. 1 is a schematic elevational view, partly in cross section, of a preferred form of sorting apparatus, depicting the components thereof in a first operating position.
Figure 2:
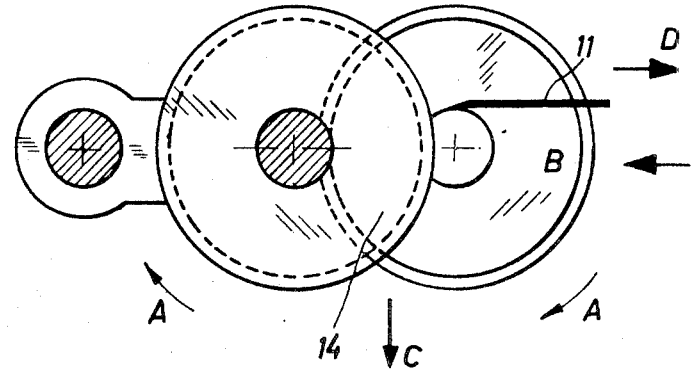
FIG. 2 is a top plan view of the sorting apparatus depicted in FIG. 1, partly in sectional view as taken substantially along the line II—II of FIG. 1.

Describing now the drawings, in FIGS. 1 and 2 there is schematically illustrated a preferred embodiment of sorting apparatus which will be seen to be composed of two horizontally disposed entrainment means, in the form of entrainment disk or plate members 1 and 2 arranged in substantial parallelism to one another in spaced superimposed relationship, as shown. Each entrainment plate member 1 and 2 is seated for nonrelative rotation upon a nonvisible support plate arranged at the end of an associated drive shaft 3 and 4 respectively. These drive shafts 3 and 4 are coaxially arranged with regard to their associated circular-shaped disk or plate and, as shown in FIG. 1, extend from such associated disk or plate in opposite directions. The drive shafts 3 and 4 for the entrainment plates 1 and 2, respectively, are driven with the same rotational speed in any suitable manner. For instance, one or both of such drive shafts, may be equipped with a suitable drive mechanism or motor, as schematically indicated at 20 for the drive shaft 4. This drive motor 20 can rotate the shaft members 3 and 4 in the same sense or direction of rotation, as is the case with the arrangement of FIG. 1, or alternatively, as will be explained more fully hereinafter can also drive the shafts 3 and 4 in opposite directions when, for instance, the entrainment plate members 1 and 2 are coaxially disposed. Additionally, it will be seen that both shaft members 3 and 4 are rotatably mounted at the end of a respective arm member 5 and 6 neighboring the entrainment disks or plates 1 and 2 respectively.

Continuing, it will be seen by again referring to FIG. 1 that the shaft members 3 and 4 are stepped or provided with shoulders 7 and 8 respectively, at the end portions thereof neighboring the entrainment plate members 1 and 2 respectively. Additionally, the forwardmost respective ends of the arm members 5 and 6 are arranged in each instance between the rear face of the associated nonvisible support disk and the associated shoulder 7 and 8 situated at the rear portion of the corresponding stepped region of the shaft members 3 and 4. More specifically, it is here mentioned that the lower shaft member 3 and its associated entrainment plate member 1 is mounted at the associated arm member 5 so as to be essentially free of play in both axial and radial direction. On the other hand, the upper shaft member 4 and its associated entrainment plate member 2 is mounted at the support arm member 6 so that it is essentially free of play in the radial direction, but in the axial direction a certain amount of play is present since the stepped end portion of the shaft member 4 piercingly extending through the associated arm member 6 is longer than the thickness or width of such arm member 6 at that location. The shaft member 4 bears by means of its shoulder 8 against the arm member 6 and the entrainment plate member 2 can deviate or deflect in an upward axial direction, as should be readily apparent from the foregoing discussion. The weight of the entrainment plate member 2 can be calculated such that it is sufficient to downwardly urge such plate member under the influence of gravity in a direction towards the other entrainment plate member 1, but, if desired, it would be possible to rely upon a separate force apart from that of gravity, for instance by using a spring, to so downwardly urge the entrainment plate member 2.

The lower arm member 5 is pivotably mounted at location 9 at the nonillustrated stationary machine frame, pivot location 9 being spaced from the lengthwise axis of the shaft member 3, as shown. Due to this mounting arrangement, it is possible for the arm member 5 to be rocked out of its illustrated horizontal position into a desired inclined position, suitable fixing or clamping means, schematically indicated at 21, serving to arrest such arm member 5 in any desired position at the frame.

A substantially circular rod member or bar 10, oriented substantially perpendicular to the arm member 5, piercingly extends through the rear end of such arm member 5. This rod or bar member 10 is displaceably mounted along its lengthwise extending rod axis with respect to the arm member 5 and can be fixed in any desired displaced position relative to such arm member, schematic illustrated fastening or clamping means 22 being shown in FIG. 1 for this purpose. The upper arm member 6, which will be seen to be oriented similarly at right angles or perpendicular to the rod or bar 10, also piercingly extends through the upper neighboring end of such rod member 10. Just as was the case with regard to the mounting of the rod member 10 with respect to the lower arm member 5, here also the upper arm member 6 is mounted so as to be longitudinally displaceable within the rod or bar member 10 and, similarly, can be fixed in any desired displaced position relative thereto, by means of the schematically indicated clamping of fixing mechanism 23.

Now, in the operating position of the equipment shown in FIGS. 1 and 2 the entrainment plate members 1 and 2 are horizontally disposed and their axes of rotation are offset with respect to one another, as shown. Consequently, by best referring to FIG. 2 it will be seen that these entrainment plate members 1 and 2 only partially overlap at location 14 and their axes of rotation are located externally of such overlapping zone 14. Furthermore, outside of this overlapping zone 14 and at a small spacing above the lower entrainment plate member 1 there is arranged an object stripper mechanism 11 extending approximately parallel to the support arms 5 and 6 and to the respective diameters of the entrainment plates 1 and 2. Furthermore, this stripper mechanism or element 11 extends from the central region of the entrainment plate member 1 radially outward and somewhat past the marginal edge of such plate member. In the exemplary embodiment under consideration both of the entrainment plate members 1 and 2 are advantageously formed of a flexible or resilient elastic material, plastic, for instance, and more specifically, nylon by way of example.

Now with the components of the sorting apparatus assuming the operating position depicted in FIGS. 1 and 2, this sorting apparatus serves for the automatic sorting of flat objects in terms of or as a function of their rough and smooth faces or sides, and its mode of operation can be described as follows:

Both of the entrainment plate members 1,2 are continuously driven, and in the case under consideration continuously rotated, in the same sense or direction about their corresponding axis, as indicated by the direction represented by reference characters A. The flat objects to be sorted, for example, stamped or punched parts, are placed at location B upon the lower plate member 1. This plate member 1 then entrains or transfers such stamped parts into the overlapping zone 14. At the region of the overlapping zone 14 the stamped parts are further entrained by that entrainment plate member against which bears the rough face of the part, in other words the face or side of the stamped part which has the burrs or fins, for instance. To further elucidate, it is here mentioned that if, for instance, the stamped parts have the burr face directed upwardly, then such stamped part will be entrained by the upper entrainment plate member 2 and ejected from the equipment in the direction of the arrow C. On the other hand, stamped parts, where the burr or rough face is downwardly directed, will be entrained by the lower entrainment plate member 1 and transferred through the overlapping zone 14 until contacting the stripper element 11. At this location, the thus displaced stamped part will be transferred away towards the outside in the direction of the arrow D.

Figures 3, 4:
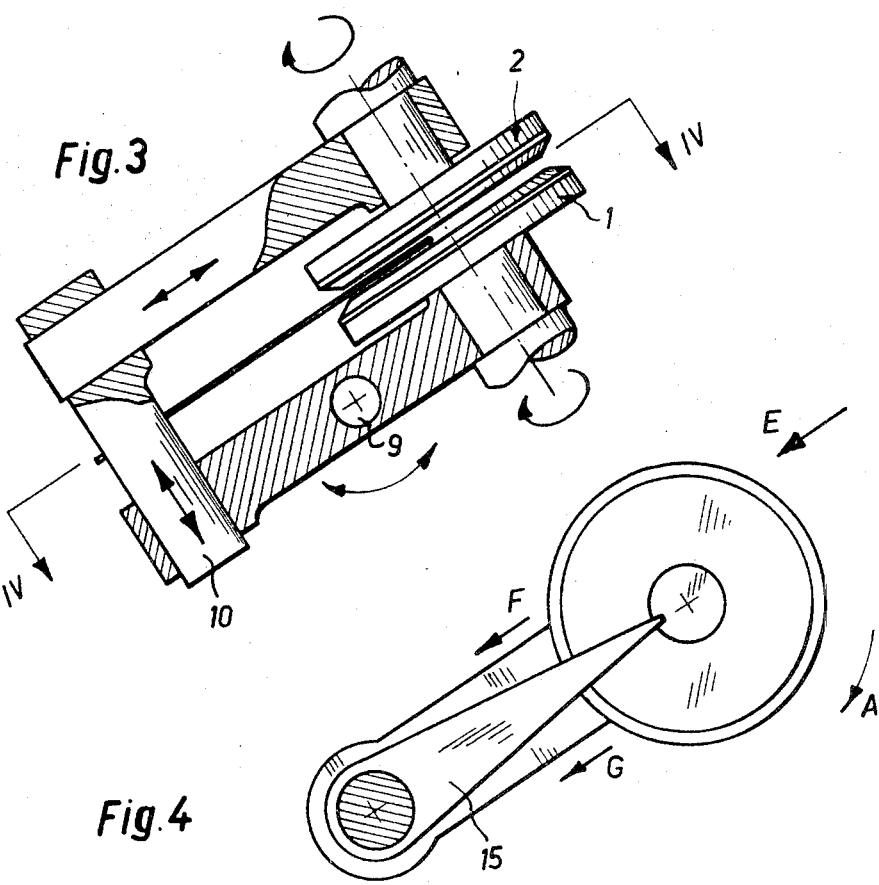
FIG. 3 is a schematic elevational view of the sorting apparatus of FIG. 1, shown substantially similar to the representation of FIG. 1, but depicting the apparatus itself in a second operating position, and using a modified form of object ejector mechanism.
FIG. 4 is a top plan view, again partly in section, of the equipment represented in FIG. 3 and taken substantially along the line IV—IV of such FIG. 3.

Consequently, through the use of this equipment, it is possible to carry out an automatic face-correct sorting of punched or stamped parts. Because of the axial displacement possibility provided for the entrainment plate member 2, this upper plate member 2 can, if necessary, move slightly upwards in axial direction during the sorting operation. Furthermore, it is here mentioned that in the case under consideration, where the entrainment plate members 1,2 rotate or move in the same direction or sense, the portions of such plate members defining the overlapping zone 14 at each instant of time, in effect, rotate in opposite directions. For instance, if any given point is considered on the surface of the upper entrainment plate member 2, and viewing the rotation of the overlapping portion of the upper plate member 2 from such point, it would appear that, with regard to FIG. 2, the overlapping portion of the upper plate member 1 is rotating downward in the plane of the drawing and that the overlapping plate portion of the other entrainment member 1 is rotating upwards in the plane of the drawing, in other words in opposite directions. As will be explained more fully hereinafter, the same conditions similarly prevail regarding the sense of movement or rotation of the instantaneous overlapping portion 14 even if the entrainment plate members 1 and 2 are themselves rotated in opposite directions, but again as will be explained more fully hereinafter, such requires a different position of the entrainment plate members, namely where they are substantially coaxially disposed relative to one another. is pivotably mounted at the rod member 10, stripper element 15 not having been Turning now to FIGS. 3 and 4 the sorting apparatus of the invention is there shown in an inclined operating position. In order for the equipment to be oriented from the position shown in FIG. 1 into that position depicted in FIG. 3, the upper arm member 6 is displaced until both entrainment disk or plate members 1 and 2 are coaxially arranged with respect to one another, and then, the entire apparatus is rocked about the pivot axis at location 9 out of its horizontal position into the illustrated inclined position. In this case, it is to be mentioned that the plate members 1 and 2 previously formed of nylon, have been replaced by plate members formed of a hardened or sintered metal. Furthermore, a stripper element 15 not having been illustrated in FIGS. 1 and 2, and such stripper element can be rocked or pivoted between the entrainment plates 1 and 2. In this case, the stripper element 11 of the arrangement of FIG. 1 has been removed.

In the last-mentioned position of the equipment, the latter serves for sorting of objects, such as, for instance, flat stamped or punched parts, in terms of their thickness and flatness, and the mode of operation can be considered as follows:

Once again, both entrainment plate members 1 and 2 rotate without interruption in the same sense or direction, as indicated by the direction of the arrow A. The objects to be sorted are introduced at location E between the entrainment plates 1 and 2. Those objects which do not exceed the maximum permissible thickness fall through between these plates 1,2 and depart therefrom at location F. On the other hand, objects whose thickness is greater than the maximum permissible thickness are clamped between the entrainment plate members 1 and 2, entrained by such in the direction of arrow A and then outwardly ejected at location G by the stripper element 15. This stripper element or mechanism 15 is located between both ejection locations F and G.

Furthermore, it is here mentioned that the apparatus depicted in FIG. 1 can also be successfully employed as a sorting mechanism for sorting flat objects in terms of or as a function of their rough and smooth faces or sides, if both entrainment plate members 1 and 2 are adjusted so that they are coaxially positioned with respect to one another and driven by the drive mechanism 20 in opposite senses or directions. Each of the objects introduced between the plates 1 and 2 is entrained by that plate member against which faces the rough side or face of the object. In order to outwardly eject the objects there is then advantageously employed the stripper element 15 illustrated in the arrangement of FIGS. 3 and 4.

Finally, it is here mentioned that with the operation of the sorting equipment of FIG. 1, modified to the extent that the plate members 1 and 2 are coaxially disposed, and wherein such plate members rotate in opposite directions, the overlapping portions of such plate members, here overlapping being total because of the coaxial arrangement, move in opposite directions or sense just as was the situation with the equipment arrangement of FIG. 1, even though there the plate members were moving in the same direction or sense. Hence, it can be stated that when the equipment is used for sorting the objects in accordance with varying properties of oppositely disposed surfaces of such objects, at least the overlapping zone or portion of the plate members move in opposite directions, regardless of whether the plate members themselves are driven in the same direction or in an opposite direction.

While with the exemplary embodiments of equipment shown herein the entrainment members have been illustrated as rotatable disks or plates, capable of assuming the various positions discussed above relative to one another and spatially, it is here remarked by way of completeness that such type construction is but exemplary inasmuch as other structures of entrainment members, such as belts or bands, for instance, properly positioned to cooperate with one another could be utilized to achieve the same or analogous sorting effect.

While there is shown and described present preferred embodiments of the invention, it is to be distinctly understood that the invention is not limited thereto but may be otherwise variously embodied and practiced within the scope of the following claims.

What is claimed is:

1. An apparatus for sorting substantially similar type objects which differ from one another either in terms of the properties of two oppositely situated surfaces of each such object or the spacing of such two surfaces from one another, comprising a pair of driven entrainment means for entraining the objects, each of said entrainment means being provided with an object entrainment surface, said entrainment surfaces being spaced in substantial parallelism from one another, means for selectively displaceably mounting said entrainment members such that their entrainment surfaces at least partially overlap one another, said mounting means serving to selectively position said entrainment members in desired relative orientation to one another for sorting objects either on the basis of the property differences of said two oppositely situated object surfaces or on the basis of the spacing between said two oppositely situated surfaces, and means for driving said two entrainment members in the same sense during one operating condition of the apparatus when said entrainment members are used for sorting objects with varying spacing between said two surfaces and during another operating condition of the apparatus for driving said two entrainment members either in the same sense or in an opposite sense when said two entrainment members are used for sorting objects which differ from one another by virtue of differences in the properties of said two oppositely situated surfaces, the position of said entrainment members relative to one another and the sense of driving thereof being chosen such that at least those portions of said entrainment members which overlap move in respective opposite directions.

2. The apparatus as defined in claim 1, wherein during said one operating condition of the apparatus said entrainment surfaces assume a position which is inclined with respect to a horizontal plane.

3. The apparatus as defined in claim 1, wherein during said another operating condition of the apparatus said entrainment surfaces are essentially horizontally positioned.

4. The apparatus as defined in claim 1, wherein during said another operating condition of the apparatus said entrainment members are formed at least at said entrainment surfaces thereof from a resilient elastic plastic material.

5. The apparatus as defined in claim 1, wherein said entrainment members are constructed in the form of substantially platelike members, and said driving means serve to drivingly rotate said platelike entrainment members in desired rotational sense with respect to one another.

6. The apparatus as defined in claim 5, wherein said displaceably mounting means for said entrainment members mount both of said platelike entrainment members in offset relationship with respect to one another so that said entrainment surfaces partially overlap to define an overlapping region, said driving means driving said platelike entrainment members in the same rotational sense, and stripper means arranged subsequent to said overlapping region above a lower one of said entrainment members for outwardly ejecting the objects which are sorted away from the apparatus.

7. The apparatus as defined in claim 5, wherein said displaceably mounting means for said entrainment members mount both of said platelike entrainment members substantially coaxially with respect to one another, said driving means driving said platelike entrainment members in opposite rotational sense from one another, and at least one stripper means operatively engaging into the intermediate space between said entrainment surfaces for outwardly ejecting objects away from the apparatus.

8. The apparatus as defined in claim 5, wherein during said one operating condition of the apparatus said entrainment surfaces assume a position which is inclined with respect to a horizontal plane, said displaceably mounting means for said entrainment members mounting both of said platelike entrainment members coaxially with respect to one another, said driving means driving said platelike entrainment members in the same rotational sense, and stripper means operably engaging in the space between said entrainment surfaces for outwardly ejecting the objects away from the apparatus.

9. The apparatus as defined in claim 5, wherein said displaceably mounting means comprise a pivotably mounted support for both of said platelike entrainment members, at least one of said platelike entrainment members being adjustably positionable in axial direction and at least one of said platelike entrainment members being adjustably positionable in a plane containing the associated entrainment surface of said last-mentioned platelike entrainment member and being fixable in its momentary adjustable position.

10. The apparatus as defined in claim 5, wherein said mounting means include means for mounting one of said platelike entrainment members to possess axial play, said last-mentioned entrainment member being subjected to the action of a predetermined force to displace same into a closer position with respect to the oppositely situated platelike entrainment member.

* * * * *